(12) United States Patent
McCarville

(10) Patent No.: US 10,729,197 B2
(45) Date of Patent: Aug. 4, 2020

(54) DEVICE FOR ACCURATELY POSITIONING UNIFORM ACCOUTREMENTS

(71) Applicant: William E. McCarville, Phenix City, AL (US)

(72) Inventor: William E. McCarville, Phenix City, AL (US)

(*) Notice: Subject to any disclaimer, the term of this patent is extended or adjusted under 35 U.S.C. 154(b) by 0 days.

(21) Appl. No.: 16/052,320

(22) Filed: Aug. 1, 2018

(65) Prior Publication Data

US 2020/0037689 A1    Feb. 6, 2020

(51) Int. Cl.
| | | |
|---|---|---|
| A41H 1/00 | (2006.01) | |
| A41H 1/02 | (2006.01) | |
| A41D 29/00 | (2006.01) | |
| G06F 16/332 | (2019.01) | |
| A44C 3/00 | (2006.01) | |
| A41H 31/00 | (2006.01) | |

(52) U.S. Cl.
CPC .............. *A41H 1/02* (2013.01); *A41D 29/00* (2013.01); *A41H 31/00* (2013.01); *A44C 3/002* (2013.01); *G06F 16/3328* (2019.01)

(58) Field of Classification Search
CPC .................................................. G06F 16/3328
USPC .................................................... 33/2 R, 563
See application file for complete search history.

(56) References Cited

U.S. PATENT DOCUMENTS

| | | | |
|---|---|---|---|
| 2,387,986 A | 10/1945 | Evans | |
| 3,129,515 A | 4/1964 | Best | |
| 3,331,342 A * | 7/1967 | Herrmann | D05B 3/10 112/136 |
| 3,376,651 A | 4/1968 | Carey | |
| 4,302,884 A | 12/1981 | Pallone | |
| 5,063,684 A | 11/1991 | Winters | |
| 5,782,022 A | 7/1998 | Tubberville | |
| 6,131,620 A * | 10/2000 | Mette | B21F 1/02 140/123 |
| 6,311,408 B1 * | 11/2001 | Madayag | A41D 27/20 33/1 G |
| 7,559,153 B2 | 7/2009 | Allen | |
| 7,587,839 B1 * | 9/2009 | Winter | A41D 29/00 33/653 |
| 7,637,028 B2 * | 12/2009 | Allen | B25H 7/00 33/563 |
| 8,356,433 B2 * | 1/2013 | Babbitt | A44C 3/002 24/114.05 |
| 8,640,366 B1 * | 2/2014 | Solberg | A45F 5/02 33/653 |
| 9,743,697 B1 | 8/2017 | Gerecht | |
| 2010/0122469 A1 * | 5/2010 | Allen | B25H 7/02 33/653 |
| 2013/0061484 A1 * | 3/2013 | Davignon | A41D 29/00 33/653 |
| 2013/0227847 A1 * | 9/2013 | Peake | A41H 1/00 33/17 R |
| 2015/0335188 A1 | 11/2015 | Davis | |

* cited by examiner

*Primary Examiner* — George B Bennett
(74) *Attorney, Agent, or Firm* — Bookstein IP Law; Arthur Z. Bookstein

(57) ABSTRACT

A device to facilitate placement of accoutrements on a uniform.

6 Claims, 1 Drawing Sheet

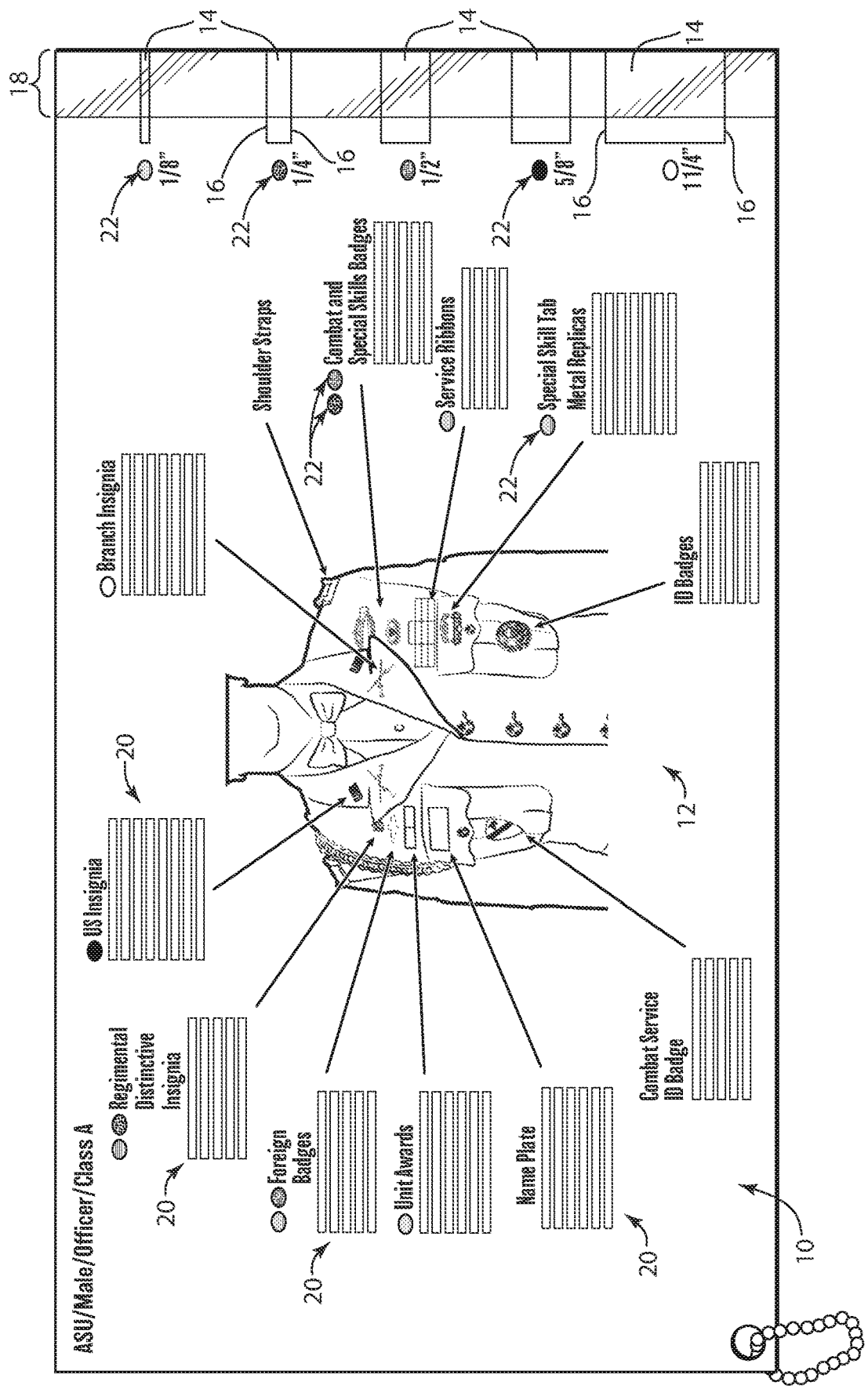

DEVICE FOR ACCURATELY POSITIONING UNIFORM ACCOUTREMENTS

FIELD

The invention relates to devices to facilitate the proper positioning of accoutrements on military or civilian uniforms.

BACKGROUND

It is common for service-related organizations to have uniforms that identify and distinguish the service organization. Such organizations include the military (army, navy, etc.) and civilian (police, firefighters, etc.). Typically, such uniforms have standardized designs and distinguishing characteristics and may be adorned with symbols and accoutrements representing the service organization, the individual's rank and other indicators of the individual's experience and accomplishments. Some organizations have different uniforms for different occasions (e.g., formal dress, fatigues, etc.) For example, military uniforms may include country identification, service ribbons, special skills indicators, nameplate, badges, organization unit or branch, etc. Typically, such organizations have strict regulations as to the details of the uniform as well as the positioning of the various types of accoutrements on the uniform. Many of such accoutrements are detachable from the uniform, for example, in order to clean or repair the uniform, and must be reattached in the proper position after the uniform is returned. It would be desirable to provide a simple, easy-to-use device to facilitate proper placement of the accoutrements on the uniform.

SUMMARY

The invention includes a substrate having a plurality of separate space-defining segments, each segment corresponding to a defined dimension related to placement of accoutrements for the particular uniform. The substrate also includes a graphic illustration of the subject uniform with properly placed accoutrements, with each type of accoutrement being associated with a legend describing the proper position of the accoutrement and the spacing of the accoutrement relative to another portion of the uniform or another accoutrement. Each of the space-defining segments and associated legends have coded indicia to associate each legend and accoutrement with one or more of the space-defining segments.

THE DRAWING

The invention will be appreciated more fully from the following description and the accompanying drawing which is a plan view of the device.

ILLUSTRATIVE EMBODIMENT

The device includes a substrate 10 that may be formed from a variety of materials such as plastic, metal or other suitable material and of sufficient thickness as to be durable in its intended use. A graphic illustration 12 of the subject uniform, with the types of accoutrements relevant to the organization in place, is provided, for example, by imprinting or encapsulating in a transparent lamination, so as to be visible by the user. The substrate 10 also includes a plurality of space-defining segments 14, each defining a dimension different than the other space-defining segments. The space-defining segments 14 may be defined by imprinting space-defining lines 16 or by forming notches or cut-outs along an edge defined by a portion of the substrate. Each space-defining segment corresponds to a measurement that is relevant to the placement of at least one accoutrement on the particular uniform. In the illustrative embodiment, the graphic illustration corresponds to a uniform used by the U.S. Army and the associated Army regulations utilize measurements of ⅛ inch, ¼ inch, ½ inch, ⅝ inch and 1¼ inch. Each space-defining segment 14 may be associated with a numerical imprint of the particular dimension. When the space-defining segments are indicated by imprinted lines 16 they may be formed along an edge of the substrate and the margin 18 along that edge may be transparent to allow the user to position the correct space-defining segment over the uniform to determine the proper placement for a particular accoutrement.

The substrate also includes a legend 20 associated with each type of accoutrement. Each legend 18 describes the accoutrement and its correct position or spacing, or both, relative to a portion of the uniform or another accoutrement, or both. Additionally, a plurality of coded indicia 22 are provided to correlate at least some of the accoutrements with at least one of the space-defining segments 14. Each space-defining segment is identified with one of the indicia. The legends for a plurality of types of accoutrement include at least one and may include plural of the indicia where proper positioning may call for more than one spacing. In the illustrative embodiment, the indicia may comprise different color, there being different colors associated with each space-defining segment. This arrangement provides a quick and easy-to-use means to determine the proper placement and positioning of the accoutrement by simply determining which of the indicia 22 correspond(s) to the particular accoutrement and utilizing the space-defining segment associated by that indicia 22 to place the accoutrement on the uniform.

In using the device, the type of accoutrement is determined and the position of the accoutrement on the uniform is determined from the legend. If the legend calls for a particular spacing of the accoutrement from one or more other references on the uniform or another accoutrement, the indicia associated with that accoutrement to be placed may be used to select the space-defining segment(s) corresponding to that indicia. The selected space-defining segment(s) then can be placed properly over the uniform to establish the position of the accoutrement to be placed.

Additionally, the device may include a cord 24 in the form of a loop to enable it to be looped conveniently over a clothes hanger so that it is readily available for use.

Thus, by the foregoing, I have described a simple, easy-to-use device for placing accoutrements on a uniform. It should be understood, however, that the foregoing description is merely illustrative and that other embodiment, modification and equivalents may be apparent without departing from the principles of the invention.

Having thus described the invention, I claim:

1. A device to facilitate placement of accoutrements on a uniform comprising:
    a substrate;
    a graphic illustration of a uniform with accoutrements in position on the uniform;
    a plurality of legends on the substrate each legend associated with a type of accoutrement, each legend including information as to the proper location of the accoutrement with respect to elements of the uniform or to other accoutrements, or both;

the substrate having a plurality of space-defining segments each different from the others; and a plurality of indicia, each distinct from the other, each of the space-defining segments being associated with only one of the indicia, a plurality of the legends being associated with at least one of the indicia, whereby a user can determine which of the space-defining segments correspond to the placement of a particular type of accoutrement by reference to the legend for that type of accoutrement, and may align the particular space-defining segment or segments over the uniform to determine the proper position for the accoutrement.

2. The device to facilitate placement of accoutrements on a uniform as defined in claim 1 wherein the space-defining segments are imprinted along an edge of the substrate.

3. The device to facilitate placement of accoutrements on a uniform as defined in claim 2 wherein at least the margin along the edge of the substrate that contains the space-defining segments is transparent.

4. The device to facilitate placement of accoutrements on a uniform as defined in claim 1 wherein the space-defining segments define measurements of ⅛ inch, ¼ inch, ½ inch, ⅝ inch and 1¼ inch.

5. The device to facilitate placement of accoutrements on a uniform as defined in claim 1 wherein each of the space-defining segments is associated with indicia, each indicia being distinct from the others, a plurality of the types of accoutrements being associated with at least one of the indicia.

6. The device to facilitate placement of accoutrements on a uniform as defined in claim 1 wherein each of the indicia comprises a color different from that of the other indicia.

* * * * *